(12) United States Patent
Pitolaj et al.

(10) Patent No.: US 10,435,534 B2
(45) Date of Patent: Oct. 8, 2019

(54) DIELECTRIC SUBSTRATE COMPRISING UNSINTERED POLYTETRAFLUOROETHYLENE AND METHODS OF MAKING THE SAME

(71) Applicant: Garlock Sealing Technologies LLC, Palmyra, NY (US)

(72) Inventors: Stefan Pitolaj, Macedon, NY (US); Allen F. Horn, III, Rogers, CT (US); Christopher J. Caisse, Danielson, CT (US); Patricia A. LaFrance, Pomfret Center, CT (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 142 days.

(21) Appl. No.: 15/352,096

(22) Filed: Nov. 15, 2016

(65) Prior Publication Data
US 2017/0145182 A1    May 25, 2017

Related U.S. Application Data

(60) Provisional application No. 62/259,680, filed on Nov. 25, 2015.

(51) Int. Cl.
| | |
|---|---|
| *C08K 3/22* | (2006.01) |
| *B29C 48/02* | (2019.01) |
| *B29C 43/24* | (2006.01) |
| *C08J 5/18* | (2006.01) |
| *G06F 1/16* | (2006.01) |
| *H01B 3/00* | (2006.01) |
| *H01Q 1/24* | (2006.01) |
| *H01Q 9/04* | (2006.01) |
| *B29C 48/00* | (2019.01) |
| *B29K 105/00* | (2006.01) |

(52) U.S. Cl.
CPC .............. *C08K 3/22* (2013.01); *B29C 43/24* (2013.01); *B29C 48/022* (2019.02); *C08J 5/18* (2013.01); *G06F 1/1613* (2013.01); *H01B 3/002* (2013.01); *H01Q 1/243* (2013.01); *H01Q 9/0485* (2013.01); *B29K 2105/253* (2013.01); *C08J 2327/18* (2013.01); *C08K 2003/2241* (2013.01)

(58) Field of Classification Search
CPC . C08K 3/22; C08K 2003/2241; G06F 1/1613; H01Q 1/243; H01Q 9/0485; B29C 47/0004; B29C 43/24; C08J 5/18; C08J 2327/18; B29K 2105/253; H01B 3/002

USPC .......................................................... 524/546
See application file for complete search history.

(56) References Cited

U.S. PATENT DOCUMENTS

| | | | |
|---|---|---|---|
| 2,685,707 A | 8/1954 | Llewellyn et al. | |
| 3,953,566 A | 4/1976 | Gore | |
| 4,335,180 A | 6/1982 | Traut | |
| 4,518,737 A | 5/1985 | Traut | |
| 4,996,097 A | 2/1991 | Fischer | |
| 7,773,041 B2 | 8/2010 | Wang | |
| 8,427,377 B2 | 4/2013 | Wang | |
| 8,599,072 B2 | 12/2013 | Reed et al. | |
| 2001/0053408 A1 | 12/2001 | Allen et al. | |
| 2005/0244662 A1* | 11/2005 | Horn, III | H05K 1/0373 428/469 |
| 2006/0210806 A1 | 9/2006 | Nelson | |

FOREIGN PATENT DOCUMENTS

| | | |
|---|---|---|
| EP | 0304699 A2 | 3/1989 |
| WO | 2005066979 A1 | 7/2005 |

OTHER PUBLICATIONS

International Search Report for International Application No. PCT/US2016/062152; International Fililng Date Nov. 16, 2016; dated Feb. 22, 2017; 6 pages.
Written Opinion of the International Search Report for International Application No. PCT/US2016/062152; International Fililng Date Nov. 16, 2016; dated Feb. 22, 2017; 6 pages.

* cited by examiner

*Primary Examiner* — Ling Siu Choi
*Assistant Examiner* — Ronald Grinsted
(74) *Attorney, Agent, or Firm* — Perkins Coie LLP

(57) ABSTRACT

In an embodiment, a dielectric substrate comprises an unsintered polytetrafluoroethylene; and a high dielectric constant filler, wherein the dielectric constant of the high dielectric constant filler is greater than or equal to 35; wherein the dielectric substrate has a specific gravity of greater than or equal to 90% of a calculated theoretical density of the dielectric substrate, wherein the theoretical specific gravity is calculated based on a measured specific gravity of the high dielectric constant filler, the specific gravity of the unsintered polytetrafluoroethylene, and the relative weight fractions of the unsintered polytetrafluoroethylene and the high dielectric constant filler; and wherein the dielectric substrate has a dielectric constant of greater than or equal to 11.5 as determined at a frequency of 10 GHz.

15 Claims, 1 Drawing Sheet

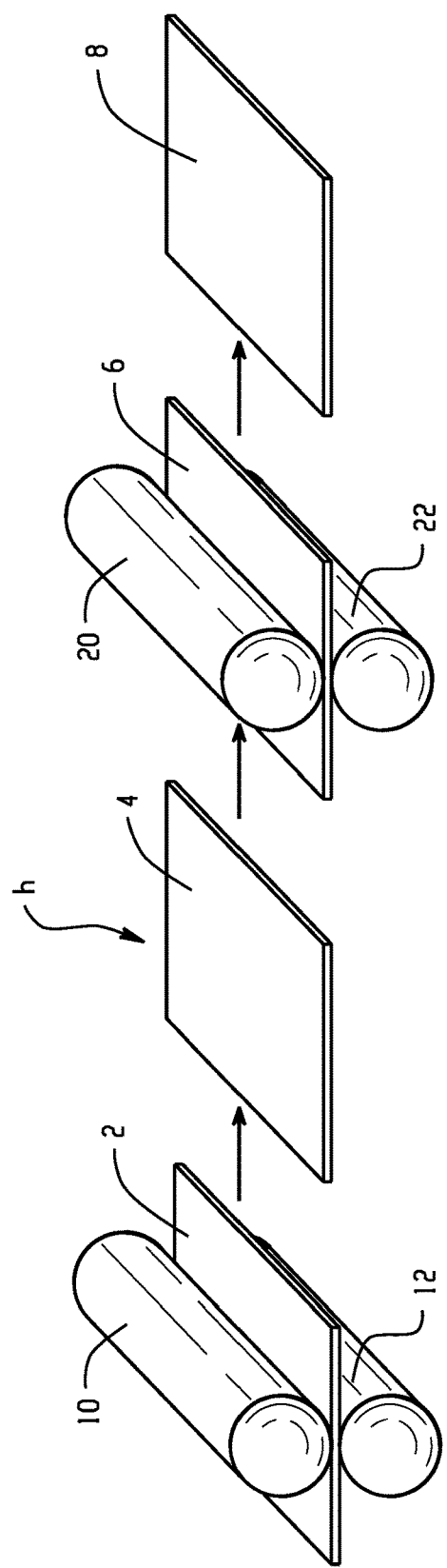

DIELECTRIC SUBSTRATE COMPRISING UNSINTERED POLYTETRAFLUOROETHYLENE AND METHODS OF MAKING THE SAME

CROSS-REFERENCE TO RELATED APPLICATION

This application claims the benefit of U.S. Provisional Application Ser. No. 62/259,680, filed Nov. 25, 2015, the contents of which are incorporated herein by referenced in their entirety.

TECHNICAL FIELD

This disclosure relates to a dielectric substrate comprising an unsintered polytetrafluoroethylene and methods of making the same.

BACKGROUND

High frequency circuitry, for example, for use at frequencies of greater than or equal to 500 megahertz (MHz) requires special engineering considerations as the wavelength of the signal is often the same approximate size or smaller than the length scale of the system under consideration. High frequency planar circuits, such as copper clad laminates are often passive devices, such as filters, whose performance is governed by the precise wavelength of the signal in the circuit. As such, the dielectric constant of the insulating, dielectric material in a copper clad laminate should be precisely controlled. It can also be important that the dielectric material also exhibits a low dielectric loss.

Polytetrafluoroethylene (PTFE) compositions have been widely used as the dielectric material in copper clad laminates. Commercially, PTFE is manufactured by two different methods: suspension polymerization and emulsion polymerization. Suspension polymerization results in "granular" PTFE. The granular material is generally used as a molding compound, both with and without fillers. A large number of PTFE objects are molded from granular PTFE. Granular PTFE can also be used in the manufacture of skived films, where skived films can be made by molding a billet of granular PTFE and skiving the film on a lathe.

Emulsion polymerization results in a PTFE dispersion. This dispersion comprises small (<0.3 micrometer (μm) diameter) particles of PTFE suspended in water. The dispersion can be concentrated and stabilized with a surfactant and used as a coating. PTFE dispersion coated glass fabric is widely used as industrial belting, architectural fabric, and high frequency circuit substrate. Alternatively, the dispersion can be coagulated, resulting in, not surprisingly, a coagulated dispersion or a fine powder PTFE composition. The PTFE fine powder has the unique property of being processable by "paste extrusion." As described in U.S. Pat. No. 2,685,707, the PTFE fine powder can be blended with a hydrocarbon liquid, lubricated, and then forced through a contracting die. The extrusion step "fibrillates" the PTFE particles. The lubricant can then be removed by evaporation or extraction. In the years since, a number of variations of the paste extrusion process have been practiced, including paste extruding or molding a preform and calendering the preform to form sheets, as described in U.S. Pat. Nos. 4,335,180 and 4,518,737. For example, the DuPont HS-10 process involves calendering in two directions to form biaxially oriented sheets. U.S. Pat. No. 3,953,566 discloses the additional stretching of the paste extruded PTFE to form a porous film or fiber with increased porosity and enhanced matrix tensile strength.

Both granular and dispersion (or coagulated dispersion) grades of PTFE can be true homopolymer compounds (containing only tetrafluoroethylene monomer) or "trace modified homopolymer" compounds (that contain less than 1 weight percent (wt %) of a co-monomer).

3M Corporation has developed a dielectric material comprising approximately 50 volume percent (vol %) PTFE and 50 vol % of a titanium dioxide ($TiO_2$) powder that was marketed under the trade name of EPSILAM 10. In forming the copper clad laminate, PTFE and a $TiO_2$ powder were first blended and lubricated with a paraffinic hydrocarbon solvent such as ISOPAR (commercially available from ExxonMobil). Sheets were then formed by paste extruding and calendering the blended material. The lubricant was then removed by drying and the sheets were laminated to a copper foil under high pressure above the melting temperature of the PTFE in a flatbed press. The copper clad laminates were then selectively etched and machined to form high frequency electronic circuitry with a dielectric constant of approximately 10. Several other manufacturers developed similar materials, such as Rogers Corporation's RT/DUROID® 6010 laminate and Keene Corporation's 810 laminate.

In later years, high dielectric constant laminates were made by impregnating woven and nonwoven glass fabrics with a slurry comprising PTFE and a ceramic powder, for example, by dip coating the slurry onto woven glass fabrics or by casting the slurry onto a glass fabric followed by lamination to a copper foil. An example of such a method includes, woven glass PTFE laminates that were made by impregnating a glass fabric with a PTFE dispersion to form a PTFE-impregnated glass fabric. The PTFE-impregnated glass fabric was then laid up, for example, with additional unreinforced skived PTFE plies, and laminated to copper foil in a flatbed press above the melting point of the PTFE. Alternatively, non-woven glass PTFE laminates were made by co-coagulating glass microfibers that have been dispersed in water with a PTFE dispersion, forming a sheet on a papermaking machine, and laminating the sheet to a copper foil. An example, of such a non-woven glass PTFE composite is Rogers RT/DUROID 5870 PTFE laminate. U.S. Pat. Nos. 4,335,180 and 4,518,737 disclose a process where the filler and a small amount of glass microfibers were co-coagulated with a PTFE dispersion and dried. The mixture was then paste extruded and calendered to form sheets. The sheets were laminated to copper foil in a flatbed press under pressure at a temperature above the melting temperature of the PTFE. In all of these cases, the PTFE was melted (also referred to herein as sintered) during the lamination step.

U.S. Pat. No. 4,996,097 discloses the manufacture of a thin, high capacitance laminate with a PTFE dielectric layer. The claimed 0.0001 to 0.005 inch (2.54 to 127 micrometer) thick dielectric layer was made by the process disclosed in U.S. Pat. No. 3,953,566, where a conductive material, such as copper, was laminated to one or both sides of the PTFE dielectric layer using a conventional lamination procedure of pressing at a pressure of 1,000 pounds per square inch (psi) (6,895 kilopascal (kPa)) and a temperature of 350 degrees Celsius (° C.), a temperature that is greater than the melting temperature of PTFE. An alternative to lamination above the melting temperature of the PTFE composition is also disclosed where a thermoset can be present to lower lamination temperature and improve adhesion of the dielectric layer to the conductive metal.

In recent years, additional applications for low loss, high dielectric constant materials have commercially arisen. The miniaturization of antennas for handheld consumer electronic devices is one such application, where high dielectric constant values will allow for a great degree of said miniaturization. U.S. Pat. Nos. 7,773,041 and 8,427,377 describe a dielectrically loaded loop antenna. U.S. Pat. No. 8,599,072 discloses a broadband antenna structure, in which the dielectric constant of the dielectric material of the cover reduces the required size of the conductive antenna element. In many of these applications, it is not necessarily desired that the high dielectric constant, low loss substrate be bonded directly to copper foil.

Higher dielectric constant materials can be achieved by using higher dielectric constant ceramic fillers, for example, having a dielectric constant in the gigahertz (GHz) range of 35-500, such as barium titanate. Many of these fillers, however, significantly increase the dielectric loss of the material and they can be difficult and not cost-effective to fabricate. The magnitude of the dielectric constant of a PTFE material can further be increased by increasing the amount of dielectric filler, but the amount of filler can be limited by the amount of filler in powder form that can be incorporated into the material. For example, depending on the particle size distribution, the surface area, and surface chemistry of the filler, loadings of greater than or equal to 50 vol % can exceed a maximum packing ratio of the powder in the material and adding additional powder can result in an increased amount of voids becoming entrained, and the material can become brittle.

Currently, commercial PTFE-titanium dioxide copper clad circuit laminates can exhibit dielectric constant values in the GHz frequency range of 10 to 12, where a maximum achievable dielectric constant is about 13.

There remains an unfulfilled need for low loss, high dielectric constant PTFE materials that exhibit higher dielectric constant values.

BRIEF SUMMARY

Disclosed herein is a dielectric composition comprising unsintered PTFE and a method of making and of using the same.

In an embodiment, a dielectric substrate comprises an unsintered polytetrafluoroethylene; and a high dielectric constant filler, wherein the dielectric constant of the high dielectric constant filler is greater than or equal to 35; wherein the dielectric substrate has a specific gravity of greater than or equal to 90% of a calculated theoretical density of the dielectric substrate, wherein the theoretical specific gravity is calculated based on a measured specific gravity of the high dielectric constant filler, the specific gravity of the unsintered polytetrafluoroethylene, and the relative weight fractions of the unsintered polytetrafluoroethylene and the high dielectric constant filler; and wherein the dielectric substrate has a dielectric constant of greater than or equal to 11.5 as determined at a frequency of 10 GHz.

In another embodiment, a method of making the dielectric substrate comprises forming a mixture comprising the unsintered polytetrafluoroethylene, the high dielectric constant filler, and a lubricant; forming a preform from the mixture; calendering the preform to form a sheet; heating the sheet to remove the lubricant at a heating temperature that is below a melting temperature of the unsintered polytetrafluoroethylene; and dry calendering the sheet after the heating to form the dielectric substrate.

In another embodiment, an article comprises the dielectric substrate.

The above described and other features are exemplified by the following FIGURE and detailed description.

BRIEF DESCRIPTION OF THE DRAWING

The FIGURE is an illustration of an embodiment of a method of forming the dielectric substrate.

DETAILED DESCRIPTION

Polytetrafluoroethylene is a polymer that is often used to fabricate dielectric substrates for use in high frequency electronic circuitry and devices as it exhibits a low dielectric loss, a high melting point, and good chemical resistance. As is described above, polytetrafluoroethylene substrates are generally laminated with copper foil under high temperature and pressure to form such circuit materials. Recently, applications have arisen for high dielectric constant fluoropolymer substrates that are not bonded to a copper foil, for example, for use as an antenna in mobile phones or tablets. While the dielectric properties of a fluoropolymer composition can be altered by varying the type of dielectric filler and the amount of the filler, non-copper clad fluoropolymer compositions with dielectric constants of greater than 11 at a frequency of 10 GHz, while maintaining a low dielectric loss have not been achieved.

The fluorine atoms exhibit a strong bond to the carbon backbone of PTFE and are not abstracted during the free-radical polymerization of the material. Thus, perfectly straight chains are formed that results in a nearly 100% crystalline polymeric material as polymerized having a density of about 2.3 grams per centimeter cubed (g/cm$^3$). The melting point of crystalline PTFE is about 341° C. At low molecular weights, when the molten polymer solidifies, it recovers its high degree of crystallinity and results in a very brittle material. The developers of PTFE materials discovered that a tougher and more resilient material can be achieved if the polymer was reacted to a high molecular weight. In this case, when the high molecular weight PTFE re-solidifies after melting, the chain length prevents the perfect recrystallization of the polymer chains and substantially reduces the crystalline content, resulting in a lower density, flexible material. The recrystallized PTFE has a reduced melting point of about 327° C. and a reduced density of about 2.18 g/cm$^3$. It was surprisingly discovered that this small change in density from the unsintered polytetrafluoroethylene to the recrystallized polytetrafluoroethylene resulted in a substantial reduction in the dielectric constant from the unsintered polytetrafluoroethylene to the recrystallized polytetrafluoroethylene.

It was further surprisingly discovered that a low loss PTFE dielectric substrate with a dielectric constant of greater than or equal to 11.5 at a frequency of 10 GHz can be achieved by not sintering the PTFE and additionally calendering the substrate to reduce the porosity. Specifically, the dielectric substrate can be prepared by forming a mixture comprising the PTFE, the dielectric filler, and a lubricant; forming a sheet by molding or extruding the mixture; calendering the sheet; heating the sheet to remove the lubricant at a temperature below a melting temperature of the PTFE; and dry calendering the sheet after the heating to form the substrate. The dry calendering step results in a reduction in porosity such that the substrate has an increased density, for example, exhibiting a specific gravity that is within 90% of a theoretical specific gravity. It was surprisingly discovered that the higher density of the unsintered PTFE corresponds to an increased value of the dielectric constant as compared to substrates of the same composition, but that have been sintered. The unsintered substrate also has the added benefit of not containing charring contaminants that can occur during sintering and that can result in one or more of a visual charring, a reduction in mechanical properties, and a reduction in dielectric properties.

The PTFE can comprise a homopolymer, a trace modified homopolymer, or a combination comprising one or both of the foregoing. As used herein, a trace modified PTFE homopolymer comprises less than 1 wt % of a repeat unit derived from a co-monomer other than tetrafluoroethylene based on the total weight of the polymer.

The PTFE can be polymerized by emulsion polymerization to form a dispersion that can also be further coagulated to form a coagulated dispersion or fine powder PTFE. Alternatively, the PTFE can be polymerized by suspension polymerization to form a granular PTFE. A dielectric substrate comprising a coagulated dispersion or fine powder PTFE that has been formed by paste extrusion and calendering can be less brittle as compared to a dielectric substrate of the same composition but comprising a granular PTFE.

The dielectric filler can comprise a titanate. The dielectric filler can comprise titanium dioxide (such as rutile and anatase), calcium titanate, barium titanate, strontium titanate, or a combination comprising at least one of the foregoing. The dielectric filler can comprise $TiO_2$, $SiTiO_3$, $CaTiO_3$, $BaTiO_4$, $Ba_2Ti_9O_{20}$, or a combination comprising at least one of the foregoing. The dielectric filler can comprise $TiO_2$, $SiTiO_3$, $CaTiO_3$, or a combination comprising at least one of the foregoing.

The dielectric filler can comprise a coated dielectric filler. The coating can comprise a silane coating, a titanate coating, a zirconate coating, or a combination comprising at least one of the foregoing. The coating can comprise phenyltrimethoxysilane, p-chloromethylphenyltrimethoxy silane, aminoethylaminotrimethoxy silane, aminoethylaminopropyltrimethoxy silane, phenyltriethoxysilane, 3,3,3-trifluoropropyltrimethoxysilane, (tridecafluoro-1,1,2,2-tetrahydrodecyl)-1-triethoxysilane, neopentyl(diallyl)oxytrine- odecanoyl titanate, neopentyl(diallyl)oxytri(dioctyl)phosphate titanate, neopentyl(diallyl)oxytri(dioctyl)pyrophosphate zirconate, neopentyl(diallyl)oxytri(N-ethylenediamino)ethyl zirconate, or a combination comprising at least one of the foregoing. The coating can comprise a silane coating such as phenyltrimethoxysilane. The dielectric filler can be pre-treated with the coating agent prior to forming the mixture, or the coating agent can be added to the mixture. The coating can be present in an amount of 0.2 to 2.0 wt %, or 0.8 to 1.2 wt % based on the total weight of the filler.

The dielectric filler can have a dielectric constant of greater than or equal to 100, or greater than or equal to 150, or greater than or equal to 200 at a frequency of 10 GHz. The dielectric filler can have a dielectric constant of greater than or equal to 35, or 35 to 500, or 100 to 400 at a frequency of 10 GHz. The dielectric filler can have a low dielectric loss of less than or equal to 0.005 at a frequency of 10 GHz.

The method of forming the dielectric substrate can comprise forming a mixture comprising the coagulated dispersion or fine powder PTFE, the dielectric filler, and a lubricant; forming a preform from the mixture; calendering the preform to form a sheet; heating the sheet to remove the lubricant at a temperature below a sintering temperature of the PTFE; and dry calendering the sheet after the heating to form the dielectric substrate.

Examples of lubricants include ISOPAR™ commercially available from Exxon Chemical Company, Houston, Tex. The lubricant can comprise glycol ethers such as dipropylene glycol. The lubricant can comprise at least one of the foregoing lubricants.

The mixture can be formed into the preform, for example, by molding or extruding the mixture. The extruding can be performed at a temperature of 15 to 50° C. to form the preform.

The preform is then calendered in the lubricated state (also referred to herein as lubricated calendering). The calendering can comprise a single calendering step or multiple calendering steps. For example, the sheet can be subjected to an initial calendering step, wherein the sheet is passed through at least one set of opposing stainless steel calendering rolls, which have an adjustable gap thickness there between. The gap thickness between the rolls can be adjusted to decrease the thickness of the sheet as it passes between them. During the calendering, the width of the sheet will be maintained, but the length of the sheet increases as the thickness decreases. One example of a commercially available calendering machine is the small Killion two-roll stack (Killion Extruders, Inc., Cedar Grove, N.J. 07009). The sheet can then be further calendered in one or more calendering steps, for example, at an angle of 45 to 135°, for example, 90° of the initial calendering direction.

The calendered sheet can be heated to remove the lubricant from the sheet. The heating can be accomplished by heating the film, for example, at a heating temperature of less than or equal to 300° C., or 50 to 300° C., or 100 to 200° C. The heating temperature can be less than a melting temperature of the fluoropolymer. After heating, the sheet can comprise less than or equal to 1 wt %, or 0 to 0.01 wt % of the lubricant based on the total weight of the sheet.

After heating, the sheet can then be dry calendered in one or more calendering steps as described above to form the dielectric substrate. A second dry calendering step can occur at an angle of 45 to 135°, for example, 90° of the initial dry calendering direction. The dry calendering can occur in the same calendering direction as the initial lubricated calendering direction. The dry calendering can occur in a different calendering direction as the initial lubricated calendering direction, for example, the dry calendering can occur at an angle of 45 to 135°, for example, 90° of the initial lubricated calendering direction.

One or both of the lubricated calendering and the dry calendering can occur without the application of heat, for example, at calendering temperature equal to room temperature (20 to 25° C.).

An embodiment of the method of forming the dielectric substrate is illustrated in FIG. 1. FIG. 1 illustrates extruded sheet 2 that is being calendered between rolls 10 and 12. The calendered sheet is then heated by application of heat h to form dry sheet 4. Dry sheet 4 is then dry calendered as sheet 6 between rolls 20 and 22 to form dielectric substrate 8.

The dielectric substrate can comprise 50 to 85 wt %, or 65 to 80 wt % of the dielectric filler based on the total weight of the substrate. The dielectric substrate can comprise 15 to 50 wt %, or 20 to 55 wt % PTFE based on the total weight of the substrate. The dielectric substrate can consist essentially of or can consist of the PTFE and the dielectric filler.

The specific gravity can be at least 90% of a theoretical specific gravity, wherein the theoretical specific gravity is calculated based on a measured specific gravity of the dielectric filler, the specific gravity of the PTFE, and the relative fractions of the two components.

The dielectric substrate can have a dielectric constant of greater than or equal to 11.5, or greater than or equal to 12, or 12 to 18, or 13 to 18. The dielectric substrate can have a dissipation factor of less than or equal to 0.003 as measured at a frequency of 10 GHz.

An article can comprise the dielectric substrate. The article can be an antenna. The antenna can be used in a mobile phone (such as a smart phone), a tablet, a laptop, or the like.

The dielectric substrate can be free of a conductive layer, such as a copper foil.

The dielectric substrate can be used in applications not requiring bonded copper, for example, where the dielectric substrate is adhesively bonded to a prefabricated circuit or conductor that can be formed, for example, by laser direct writing, plating, or printing of conductive inks.

The dielectric substrate can be free of a metallization layer, such as a copper layer.

The following examples are provided to illustrate articles with enhanced thermal capability. The examples are merely illustrative and are not intended to limit devices made in accordance with the disclosure to the materials, conditions, or process parameters set forth therein.

EXAMPLES

In the examples, the specific gravity was determined using Archimedes Principle.

The dielectric constant and the dissipation factor were determined at 10 GHz in accordance with IPC-TM-650 2.5.5.5c.

The theoretical specific gravity of the coated titanium dioxide was taken to be 4.23 and the theoretical specific gravity for the sintered PTFE was taken to be 2.18.

The components used in the examples are set forth in Table 1, where $m^2/g$ is meters squared per gram.

TABLE 1

| Component | Description | Source |
|---|---|---|
| Coated titanium dioxide | Titanium dioxide with a median particle size of 15 micrometers and a specific surface area of 0.5 $m^2$/g and with a 1 wt % coating of phenyltrimethoxysilane. | Titanium dioxide: Rogers Proprietary Phenyltrimethoxysilane: DOW CORNING DC-6124 |
| Polytetra-fluoroethylene | PTFE fine powder | DuPont |
| Lubricant | ISOPAR H | Exxon Mobil |

Example 1

Preform Properties

A coated titanium dioxide was prepared by treating the titanium dioxide with 1 wt % of phenyltrimethoxysilane and curing for 16 hours at 105° C.

A mixture of 70 wt % of the coated titanium dioxide and 30 wt % of the PTFE was formed. The lubricant was added to the mixture and the lubricated mixture was extruded to form a 1.3 centimeters (cm) by 10.2 cm by 10.2 cm sheet. The extruded sheet was biaxially calendered by calendering the sheet in a first direction, rotating the sheet 90°, and calendering the sheet in the second direction. The biaxially calendered sheet had a sheet with a thickness of 0.05 centimeters (cm). The lubricant was then evaporated. The properties of the sheet were determined and are shown in Table 2. Table 2 shows that the specific gravity of the sheet was only 2.56 due to its high porosity, and the dielectric constant was only 7.29.

Example 2

Effect of Sintering and Pressing

A sheet was prepared using the method of Example 1. A weight was placed on top of the sheet and was then sintered in an oven under pressure for 10 minutes at a temperature of 350° C. The properties of the sheet are shown in Table 2.

Table 2 shows that the application of the pressure under heat resulted in a slight increase of both the specific gravity to a value of 2.79 and the dielectric constant to a value of 8.66.

Example 3

Effect of Laminating

A sheet was prepared using the method of Example 1. The sheet was then laminated in between two sheets of copper foil in a flatbed press at a pressure of 1,100 psi (7,584 kilopascals) at a temperature of 370° C. for 2 hours. The copper was etched off of both surfaces and the properties of the sheet were determined. The properties are shown in Table 2.

Table 2 shows that the lamination step increased the specific gravity to 3.12 and the dielectric constant to a value of 11.30.

Example 4

Effect of Laminating a Sintered Sheet

A sheet was prepared using the method of Example 3 except that the sheet was then sintered in an oven at 350° C. prior to laminating. The properties are shown in Table 2.

Table 2 shows that specific gravity and the dielectric constant of the sheet of Example 4 are essentially the same as those of Example 3 indicating that the sintering step prior to lamination has no effect on the properties of the resultant sheet.

Example 5

Effect of Calendering an Unsintered Sheet

A sheet was prepared using the method of Example 1 and the unsintered, unlubricated sheet was further calendered. The properties are shown in Table 2.

Table 2 shows that calendering a dry calendered unsintered sheet surprisingly resulted in an increase in the specific gravity to a value of 3.30 and an increase in the dielectric constant to a value of 13.53, a value of almost twice that of the dielectric constant of Example 1.

Example 6

Effect of Sintering the Calendered Sheet

A sheet was prepared using the method of Example 5. The calendered sheet was then laminated in between two sheets of copper foil in a flatbed press at a pressure of 1,100 psi (7,584 kilopascals) at a temperature of 370° C. for 2 hours. The copper was etched off of both surfaces and the properties of the sheet were determined. The properties are shown in Table 2.

TABLE 2

| Example | 1 | 2 | 3 | 4 | 5 | 6 |
|---|---|---|---|---|---|---|
| Sintered | No | Yes | No | Yes | No | Yes |
| Dry Calendered | No | No | No | No | Yes | Yes |
| Specific gravity | 2.56 | 2.79 | 3.12 | 3.08 | 3.30 | 3.21 |
| Dielectric constant | 7.29 | 8.66 | 11.37 | 11.30 | 13.53 | 11.19 |
| Dissipation factor | 0.0011 | 0.0020 | 0.0020 | 0.0020 | 0.0026 | 0.0014 |

Table 2 shows that the lamination step resulted in a decrease in both the specific gravity to a value of 3.21 and the dielectric constant to a value of 11.19.

Examples 7-14

Effect of Titanium Dioxide Content

Sheets with a varying amount of titanium dioxide were made using the method of Example 5. The properties of the sheets were determined and are shown in Table 3.

TABLE 3

| Example | 7 | 8 | 9 | 10 | 11 | 12 | 13 | 14 |
|---|---|---|---|---|---|---|---|---|
| $TiO_2$ (wt %) | 68 | 71 | 73 | 73 | 75 | 75 | 77 | 77 |
| Specific gravity | 3.24 | 3.30 | 3.35 | 3.26 | 3.37 | 3.24 | 3.38 | 3.28 |
| Theoretical specific gravity | — | 3.37 | 3.42 | 3.42 | 3.47 | 3.47 | 3.52 | 3.52 |
| Dielectric constant | 12.54 | 13.52 | 15.40 | 14.60 | 16.60 | 15.20 | 17.70 | 16.80 |
| Dissipation factor | 0.0021 | 0.0026 | 0.0020 | 0.0022 | 0.0030 | 0.0020 | 0.0027 | 0.0023 |

Table 3 shows that the dielectric constant increases with increasing concentration.

Set forth the below are some embodiments of the present dielectric composition comprising unsintered PTFE, methods of making and of using the same.

Embodiment 1

A dielectric substrate comprising: an unsintered polytetrafluoroethylene; and a high dielectric constant filler, wherein the dielectric constant of the high dielectric constant filler is greater than or equal to 35; wherein the dielectric substrate has a specific gravity of greater than or equal to 90% of a calculated theoretical density of the dielectric substrate, wherein the theoretical specific gravity is calculated based on a measured specific gravity of the high dielectric constant filler, the specific gravity of the unsintered polytetrafluoroethylene, and the relative weight fractions of the unsintered polytetrafluoroethylene and the high dielectric constant filler; and wherein the dielectric substrate has a dielectric constant of greater than or equal to 11.5 as determined at a frequency of 10 GHz.

Embodiment 2

The dielectric substrate of Embodiment 1, wherein the unsintered polytetrafluoroethylene comprises a polytetrafluoroethylene homopolymer.

Embodiment 3

The dielectric substrate of any one or more of the preceding embodiments, wherein the unsintered polytetrafluoroethylene comprises a trace modified polytetrafluoroethylene homopolymer, wherein the trace modified polytetrafluoroethylene homopolymer comprises less than 1 wt % of a repeat unit derived from a co-monomer other than tetrafluoroethylene based on the total weight of the trace modified polytetrafluoroethylene homopolymer.

Embodiment 4

The dielectric substrate of any one or more of the preceding embodiments, wherein the unsintered polytetrafluoroethylene polymer is made by emulsion polymerization.

Embodiment 5

The dielectric substrate of any one or more of the preceding embodiments, wherein the high dielectric constant filler has a dielectric constant of greater than or equal to 100, or 100 to 400.

Embodiment 6

The dielectric substrate of any one or more of the preceding embodiments, wherein the high dielectric constant filler comprises titanium dioxide.

Embodiment 7

The dielectric substrate of any one or more of the preceding embodiments, wherein the high dielectric constant filler comprises titanium dioxide, calcium titanate, strontium titanate, barium titanate, or a combination comprising at least one of the foregoing.

Embodiment 8

The dielectric substrate of any one or more of the preceding embodiments, wherein the dielectric substrate comprises 50 to 85 wt %, or 65 to 80 wt % of the high dielectric constant filler based on the total weight of the dielectric substrate.

Embodiment 9

The dielectric substrate of any one or more of the preceding embodiments, wherein the dielectric substrate comprises 15 to 50 wt %, or 20 to 55 wt % of the unsintered polytetrafluoroethylene based on the total weight of the dielectric substrate.

Embodiment 10

The dielectric substrate of any one or more of the preceding embodiments, wherein the dielectric substrate consists essentially of or consists of the unsintered polytetrafluoroethylene and the high dielectric constant filler.

Embodiment 11

The dielectric substrate of any one or more of the preceding embodiments, wherein the specific gravity is at least 95% of the theoretical specific gravity of the dielectric substrate.

Embodiment 12

The dielectric substrate of any one or more of the preceding embodiments, wherein the dielectric constant of the dielectric substrate is greater than or equal to 12, or 12 to 18, or 13 to 18.

Embodiment 13

An article comprising the dielectric substrates of any one or more of the preceding embodiments.

Embodiment 14

The article of Embodiment 13, wherein the article is a mobile phone, a tablet, or a laptop.

Embodiment 15

The article of Embodiment 13, wherein the article is an antenna.

Embodiment 16

A method of making the dielectric substrate of any one or more of Embodiments 1-12, comprising: forming a mixture comprising the unsintered polytetrafluoroethylene, the high dielectric constant filler, and a lubricant; forming a preform from the mixture; calendering the preform to form a sheet; heating the sheet to remove the lubricant at a heating temperature that is below a melting temperature of the unsintered polytetrafluoroethylene; and dry calendering the sheet after the heating to form the dielectric substrate.

Embodiment 17

The method of Embodiment 16, wherein the sheet after the heating comprises less than or equal to 1 wt % or 0 to 0.01 wt % of the lubricant based on the total weight of the sheet.

Embodiment 18

The method of any one or more of Embodiments 16-17, wherein the heating temperature is less than or equal to 300° C., or 50 to 300° C., or 100 to 200° C.

Embodiment 19

The method of any one or more of Embodiments 16-18, wherein the forming the preform comprises extruding the mixture.

Embodiment 20

The method of any one or more of Embodiments 16-19, further comprising biaxially calendering the sheet after the calendering at an angle of 45 to 135° from an initial calendering direction.

In general, the disclosure can alternately comprise, consist of, or consist essentially of, any appropriate components herein disclosed. The disclosure can additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or. Reference throughout the specification to "some embodiments," "another embodiment," "an embodiment," and so forth, means that a particular element (e.g., feature, structure, and/or characteristic) described in connection with the embodiment is included in at least one embodiment described herein, and may or may not be present in other embodiments. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this disclosure belongs. Unless otherwise stated, test standards are the most recent as of the filing date of the application.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

In addition, it is to be understood that the described elements can be combined in any suitable manner in the various embodiments.

While particular embodiments have been described, alternatives, modifications, variations, improvements, and substantial equivalents that are or can be presently unforeseen can arise to Applicants or others skilled in the art. Accordingly, the appended claims as filed and as they can be amended are intended to embrace all such alternatives, modifications variations, improvements, and substantial equivalents.

What is claimed is:

1. A dielectric substrate comprising:
an unsintered polytetrafluoroethylene; and
a high dielectric constant filler, wherein the dielectric constant of the high dielectric constant filler is greater than or equal to 35;
wherein the dielectric substrate is subjected to a dry calendering step after a step of removing a lubricant from the dielectric substrate to thereby provide the dielectric substrate with a specific gravity of greater than or equal to 90% of a calculated theoretical density of the dielectric substrate, wherein the theoretical specific gravity is calculated based on a measured specific gravity of the high dielectric constant filler, the specific gravity of the unsintered polytetrafluoroethylene, and the relative weight fractions of the unsintered polytetrafluoroethylene and the high dielectric constant filler; and
wherein the dielectric substrate has a dielectric constant of greater than or equal to 11.5 as determined at a frequency of 10 GHz.

2. The dielectric substrate of claim 1, wherein the unsintered polytetrafluoroethylene comprises a polytetrafluoroethylene homopolymer.

3. The dielectric substrate of claim 1, wherein the unsintered polytetrafluoroethylene comprises a trace modified polytetrafluoroethylene homopolymer, wherein the trace modified polytetrafluoroethylene homopolymer comprises less than 1 wt % of a repeat unit derived from a co-monomer other than tetrafluoroethylene based on the total weight of the trace modified polytetrafluoroethylene homopolymer.

4. The dielectric substrate of claim 1, wherein the unsintered polytetrafluoroethylene polymer is made by emulsion polymerization.

5. The dielectric substrate of claim 1, wherein the high dielectric constant filler has a dielectric constant of greater than or equal to 100.

6. The dielectric substrate of claim 1, wherein the high dielectric constant filler comprises titanium dioxide.

7. The dielectric substrate of claim 1, wherein the high dielectric constant filler comprises titanium dioxide, calcium titanate, strontium titanate, barium titanate, or a combination comprising at least one of the foregoing.

8. The dielectric substrate of claim 1, wherein the dielectric substrate comprises 50 to 85 wt % of the high dielectric constant filler based on the total weight of the dielectric substrate.

9. The dielectric substrate of claim 1, wherein the dielectric substrate comprises 15 to 50 wt %, of the unsintered polytetrafluoroethylene based on the total weight of the dielectric substrate.

10. The dielectric substrate of claim 1, wherein the dielectric substrate consists essentially of the unsintered polytetrafluoroethylene and the high dielectric constant filler.

11. The dielectric substrate of claim 1, wherein the specific gravity is at least 95% of the theoretical specific gravity of the dielectric substrate.

12. The dielectric substrate of claim 1, wherein the dielectric constant of the dielectric substrate is greater than or equal to 12.

13. An article comprising the dielectric substrates of claim 1.

14. The article of claim 13, wherein the article is a mobile phone, a tablet, or a laptop.

15. The article of claim 13, wherein the article is an antenna.

* * * * *